United States Patent [19]

Kataoka et al.

[11] 4,253,102
[45] Feb. 24, 1981

[54] OPTICAL RECORDING APPARATUS

[75] Inventors: Keiji Kataoka, Kawagoe; Susumu Saito, Hachioji, both of Japan

[73] Assignees: Hitachi, Ltd.; Hitachi Koki Co., Ltd., both of Japan

[21] Appl. No.: 45,745

[22] Filed: Jun. 5, 1979

[30] Foreign Application Priority Data

Jun. 5, 1978 [JP] Japan .................................. 53/66770

[51] Int. Cl.³ ...................... G01D 9/42; G01D 15/10
[52] U.S. Cl. ................................... 346/108; 346/76 L
[58] Field of Search ...................... 346/76 L, 108, 75; 358/240

[56] References Cited

U.S. PATENT DOCUMENTS

| 3,651,258 | 3/1972 | Ammann | 346/108 UX |
| 3,656,175 | 4/1972 | Carlson et al. | 346/108 X |
| 4,019,186 | 4/1977 | Dressen et al. | 346/76 L X |
| 4,091,390 | 5/1978 | Smith et al. | 346/75 |

*Primary Examiner*—George H. Miller, Jr.
*Attorney, Agent, or Firm*—Craig & Antonelli

[57] ABSTRACT

In an optical information recording apparatus using as a recording light source a semiconductor laser array having a plurality of light emitting parts, the semiconductor laser array is positioned in an inclined disposition so that distance among light spots on the surface of a recording medium may be effectively small.

7 Claims, 10 Drawing Figures

OPTICAL RECORDING APPARATUS

BACKGROUND OF THE INVENTION

1. Field of the Invention

The present invention relates to an optical recording apparatus, and in particular to an optical recording apparatus in which a semiconductor laser array including a plurality of light emitting parts is employed as a recording light source.

2. Description of the Prior Art

Heretofore, there has been proposed an optical information recording apparatus in which information such as characters, numbers or figures, graphic patterns or the like can be recorded on a recording medium at a high recording speed by using for the recording light source an array of plural semiconductor lasers. A typical example of such a recording apparatus is shown in FIG. 1. Referring to the figure, the light source is constituted by an array 20 which includes a plurality of semiconductor lasers $21^{(1)}, 21^{(2)}, \ldots, 21^{(N)}$ adapted to be driven separately be respective current supply circuits $23^{(1)}, 23^{(2)}, \ldots, 23^{(N)}$ (which will be referred to collectively as a drive circuit 24 for the convenience'sake of description). The operation modes of the semiconductor lasers depend on the lasing control signals applied to the input terminal $P_{in}$ of a character generating circuit 26. For example, when the lasing control signal for a certain one of the semiconductor lasers is logic "1," the current supplied thereto from the associated current supply circuit will be interrupted to stop the lasing of that laser. On the other hand, when the lasing control signal is logic "0," then a drive current of a magnitude I corresponding to a laser output of a predetermined level is supplied to the associated semiconductor laser. The logic levels "1" and "0" of the lasing control signal input to the terminal $P_{in}$ of the character generating circuit 26 are determined by the shapes of a character or pattern to be recorded. Usually, such a lasing control logic signal is available from a computer system to which the optical recording system is associated.

Output beams $22^{(1)}, 22^{(2)}, \ldots, 22^{(N)}$ from the semiconductor lasers modulated by the respective control signals are projected onto a surface of a photo-sensitive recording medium 11 through a lens 40 in a row of magnified beam spots. More specifically, the laser beams passed through the lens 40 impinge on a reflection face 4' of a polygonal mirror 4 which is rotated by a motor 70, whereby each of the reflected laser beams $8^{(1)}, 8^{(2)}, \ldots, 8^{(N)}$ is projected onto the recording medium 11 in a sector-like scanning manner. A synchronizing signal generator 30 is provided to assure synchronization among the rotation of the polygonal mirror 4, the operation of a drive source 10 of a feeding mechanism 10' for the photo-sensitive recording medium 11 and the operation of the laser beams effected by the drive circuit 24 modulating the semiconductor lasers. The motor 70 for rotating the polygonal mirror 4 is driven by a drive source 71 which is controlled by the synchronizing signal generator 30.

In the optical information recording apparatus of the arrangement outlined above, the individual laser beam emitting parts (or light emitting points) of the semiconductor laser array 20 used as the light source are usually arrayed as close as possible to one another with a view to accomplishing a high recording density as well as a high recording speed. For example, the light emitting points may be disposed in juxtaposition to one another with an extremely small distance on the order of 10 μm. However, such a close arrangement of the individual light emitting points will undesirably involve unstable operation of the semiconductor laser array due to heat generated in the laser beam emitting portions. Thus, in order to assure a stable operation of the semiconductor laser array of the hitherto-known optical information recording apparatus, the distance among the light emitting points has to be correspondingly increased, which in turn means that the distance between the light spots on the recording medium is correspondingly increased, making it difficult to attain the high recording density and hence the high recording speed.

SUMMARY OF THE INVENTION

An object of the invention is to provide an optical information recording apparatus which is capable of stably operating at a high recording speed.

To that end, in an optical information recording apparatus according to the invention, a semiconductor laser array serving as a light source is positioned in an inclined disposition so that distance among light spots on the surface of a recording medium may be maintained effectively small even though the distance among the individual light emitting points (i.e. pitch of the light emitting points in a row) of the semiconductor laser array is increased.

DESCRIPTION OF THE PREFERRED EMBODIMENTS

Figure 1:
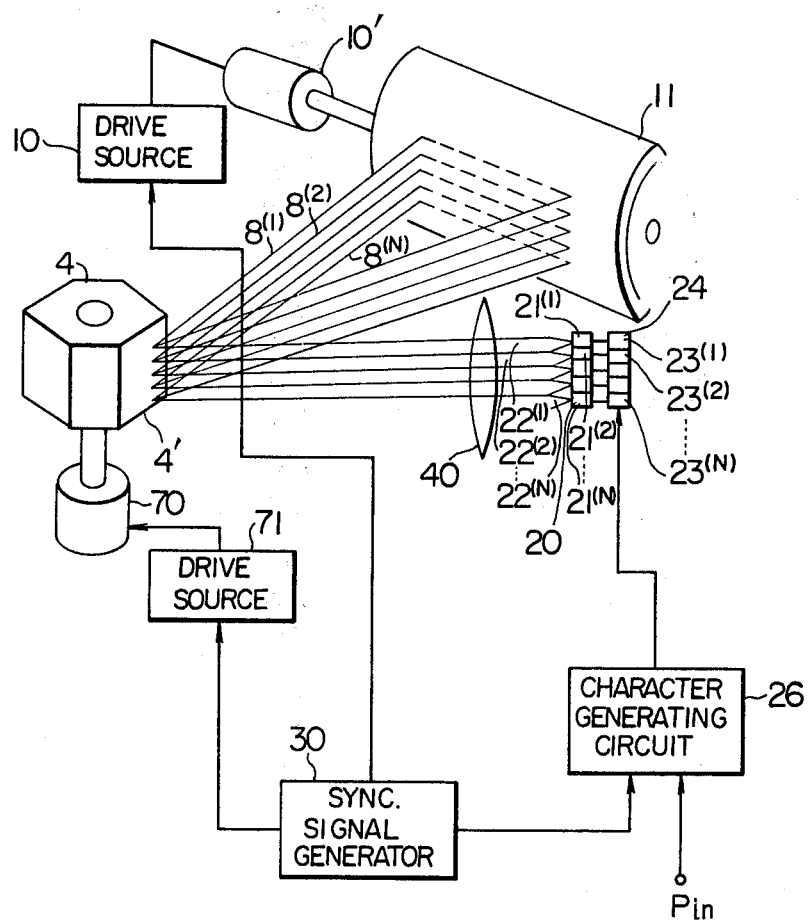
FIG. 1 shows a typical arrangement of a hitherto-known optical information recording apparatus.
Figure 2:
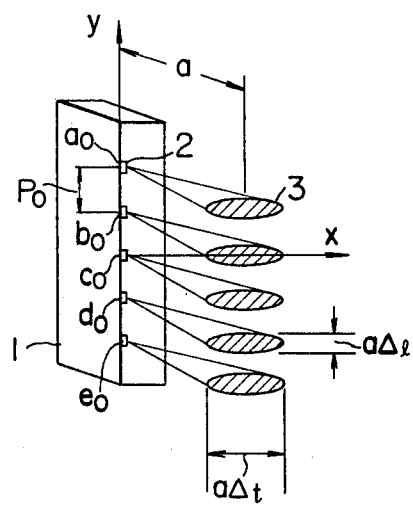
FIG. 2 illustrates an arrangement of a semiconductor laser array used in an optical information recording apparatus according to an embodiment of the invention.
Figure 3:
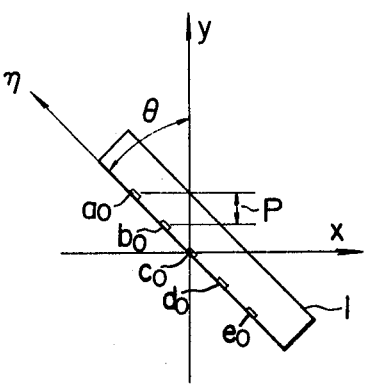
FIG. 3 illustrates a semiconductor laser array disposed in an inclined state according to the teaching of the invention.

The principle of the invention will be first described by referring to FIGS. 2 and 3.

In FIG. 2, reference numeral 1 denotes generally a semiconductor laser array including individual light emitting parts $a_0, b_0, c_0 d_0$ and $e_0$ arrayed in a row with a distance or pitch $P_o$. These individual light emitting parts or points are collectively denoted by numeral 2.

The radiant pattern of the laser beam output from the individual light emitting part is generally of an elliptical profile as indicated by numeral 3 in FIG. 2. If a spread angle of the laser beam in the x-direction is represented by $\Delta_t$ and the spread angle in the y-direction is represented by $\Delta_l$, the sizes or dimensions of the radiant pattern in the x- and y-directions at a location spaced from the semiconductor laser array 1 by a distance a can be given by $a\Delta_t$ and $a\Delta_l$, respectively, as is illustrated in FIG. 2. FIG. 3 shows the semiconductor laser array 1 in an inclined state. Namely, the semiconductor laser array 1 is inclined with an angle $\theta$ relative to the y-axis in a plane perpendicular to the light emitting direction. In other words, the light emitting parts of the semiconductor laser array are orientated in the direction $\eta$. In such inclined disposition of the semiconductor laser array, the apparent or effective pitch P of the row of light emitting points in the y-direction can be expressed by $P = P_o \times \cos\theta$, where $P_o$ is the actual pitch. Thus, it is possible to make the corresponding pitch P of the laser beams on the recording medium smaller than the actual pitch $P_o$ of the light emitting parts in the semiconductor laser array 1.

Figure 4:
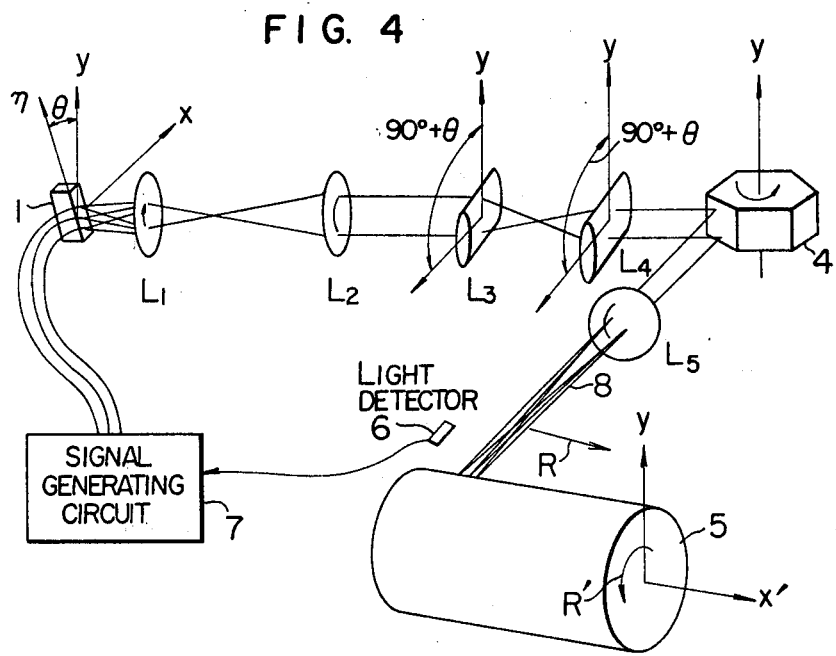
FIG. 4 illustrates schematically a general arrangement of the optical information recording apparatus according to the invention.

FIG. 4 shows schematically a general arrangement of an optical information recording apparatus incorporating therein a semiconductor laser array shown in FIG. 3. Referring to FIG. 4, reference symbols $L_1$, $L_2$ and $L_5$ denote spherical lenses, while $L_3$ and $L_4$ designate cylindrical lenses. A rotatable polygonal mirror 4 has a rotation axis extending in parallel to the y-direction or axis and is rotated in the direction indicated by the attached arrow, thereby to optically scan the recording surface of a photo-sensitive drum 5 with a laser beam bundle 8 in the direction indicated by an arrow R. The drum 5 is rotated about an axis x' perpendicular to the y-axis in the direction indicated by an arrow R', whereby the whole surface of the drum 5 may be optically scanned. Upon scanning operation, the output laser beams from the semiconductor laser array undergo intensity modulation under the control of lasing control signals produced from a signal generating circuit 7, thereby to optically record a corresponding pattern on the recording surface of the drum 5. Reference numeral 6 denotes a light detector for detecting the beam position upon the optical scanning. The output of the light detector 6 can thus be utilized as a synchronizing signal for pattern generation by the signal generating circuit 7.

According to the teaching of the invention, the semiconductor laser array 1 is inclined by an angle $\theta$ relative to the y-axis, as illustrated in FIGS. 3 and 4. Correspondingly, the cylinder axes of the cylindrical lenses $L_3$ and $L_4$ are inclined relative to the y-axis by an angle equal to $90° + \theta$.

Figure 5:
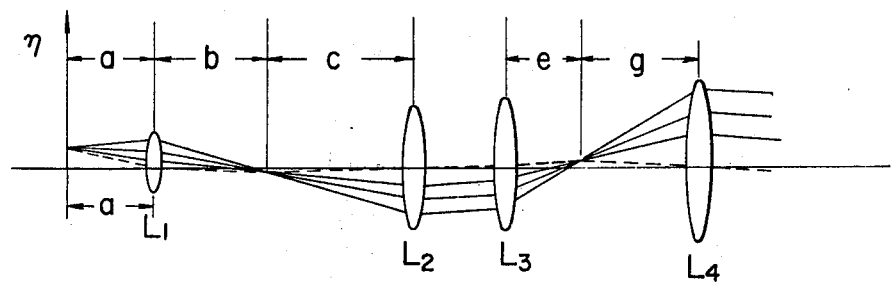
FIG. 5 is to illustrate operation of an optical system which can be employed in the optical recording apparatus according to the invention.

Now, description will be made on the optical system employed in the optical recording apparatus shown in FIG. 4 with the aid of FIG. 5 in which only one of the output laser beams is shown for the simplification of illustration.

In the first place, beam diameter in the $\eta$-axial direction will be mathematically determined. At the lens $L_1$, the beam diameter is equal to $a\Delta_l$. The laser beam leaving the lens $L_2$ is a collimated beam the diameter of which is expressed by $a\Delta_l \times (c/b)$. The cylindrical lenses $L_3$ and $L_4$ serve to enlarge the beam diameter in the $\eta$-direction. Laser light leaving the lens $L_4$ is a collimated light beam having a diameter given by $(a\Delta_l c/b) \times (g/e)$.

The beam diameter in the direction perpendicular to the $\eta$-axis at the exit side of the lens $L_2$ is equal to $a\Delta_t c/b$. Since the lenses $L_3$ and $L_4$ are cylindrical lenses, they exert no influence onto the beam diameter in the direction perpendicular to the $\eta$-axis. Accordingly, the beam diameter in the direction perpendicular to the $\eta$-axis at the exit of the lens $L_4$ is equal to $a\Delta_t c/b$. In order to make the beam diameter in the $\eta$-direction equal to the one in the direction perpendicular to the $\eta$-axis or direction, the lenses are selected so that the following equation can be fulfilled.

$$\frac{a\Delta_l c g}{b e} = \frac{a\Delta_t c}{b} \tag{1}$$

The above term is assumed to be represented by $w_o$. The laser beam having the beam diameter $w_o$ is concentrated onto the photo-sensitive drum 5 through the imaging lens $L_5$ whose focal length is expressed by $f_5$. The diameter $w_d$ of the beam impinging on the photo-sensitive drum is given by the following equation:

$$w_d = k \frac{\lambda f_5}{w_o} \tag{2}$$

where $\lambda$ represents the wavelength of the laser beam, and $k$ represents a constant which can be given by $k - 4/\pi$ in the case of the radiant pattern of the Gaussian distritution.

Next, the pitch $P_y$ in the y-axial direction of the plural laser beams simultaneously projected as constricted onto the photo-sensitive drum 5 will be mathematically determined. The light spots S produced by the plural laser beams as concentrated are arrayed in a manner illustrated in FIG. 6 and projected on the drum surface by the polygonal mirror to scan the drum surface in the direction indicated by the arrow R.

The pitch $P_y$ can be determined on the basis of the parameters of the optical system shown in FIG. 4 as follows:

$$P_y = \frac{P_o \cos\theta \times b e f_5}{a c g} \tag{3}$$

From the equations (1), (2) and (3), $$P_o = \frac{k\lambda}{\cos\theta \cdot \Delta_l} \left(\frac{P_y}{w_d}\right) \tag{4}$$

where $\lambda$ represents the wavelength. Because the pitch $P_y$ for the plural laser beams in the y-direction on the drum surface is required to be substantially equal to the spot diameter $w_d$ i.e. $P_y/w_d \approx 1.0$, the actual pitch $P_o$ will have to be equal to 12 $\mu$m when $\theta = 0°$ on the assumption that $k = 4/\pi$, $\lambda = 0.83 \times 10^{-3}$ (mm) and $\Delta_l = 5°$. In this connection, it should be recalled that close juxtaposition of the light emitting parts in the semiconductor laser array with a small distance such as 12 $\mu$m will possibly result in unstable laser operation due to heat generation at the light emitting parts. On the other hand, when the angle $\theta$ is increased, the actual pitch $P_o$ of the individual light emitting parts can be increased in accordance with the equation (4), thereby to assure the stable operation of the semiconductor laser array.

Figure 6:
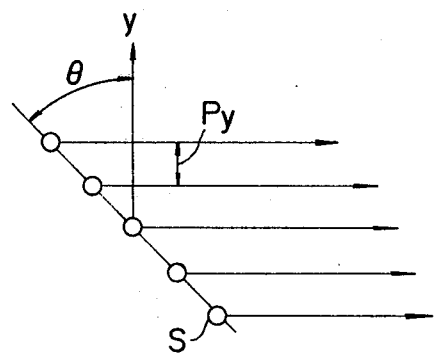
FIG. 6 is to illustrate a manner in which an optical image is built on a surface being scanned through a plurality of laser light beams.
Figure 7:
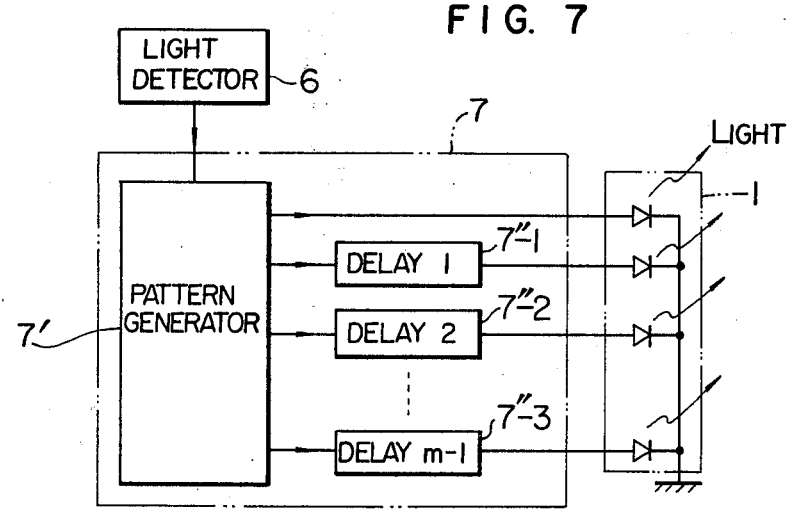
FIG. 7 is a block diagram illustrating an arrangement of a main part of the optical information recording apparatus shown in FIG. 4.

FIG. 7 shows a general arrangement of the signal generating circuit 7 shown in FIG. 4. The output signal from the light detector 6 is supplied to the pattern generator 7' as the synchronizing signal therefor. A number of output signals (e.g. m signals) from the pattern generator 7' are applied independently to the individual lasers or light emitting parts of the semiconductor laser array 1 in parallel to one another. Since the plural laser beams emitted from the laser array are imaged onto the photosensitive drum surface in light spots arrayed on a line inclined relative to the y-direction by the angle $\theta$ as illustrated in FIG. 6, it is required to supply the lasing control signals from the pattern generator 7' to the individual lasers of the semiconductor laser array through delay circuits 7''-1, 7''-2, ..., 7''-(m−1) having different delay times in order to record a pattern in parallel to the y-axis.

Figure 8:
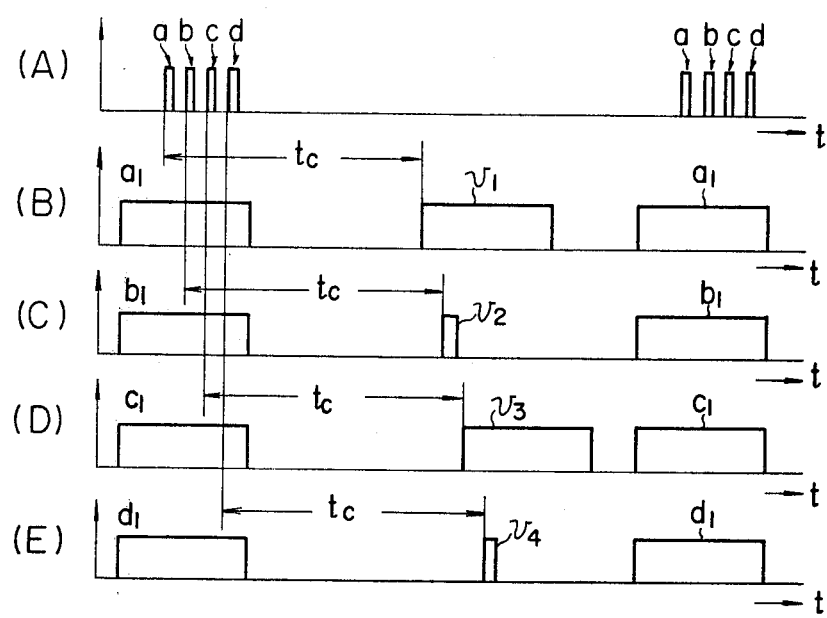
FIG. 8 shows signal diagrams to illustrate operations of the recording apparatus according to another embodiment of the invention.
Figure 10:
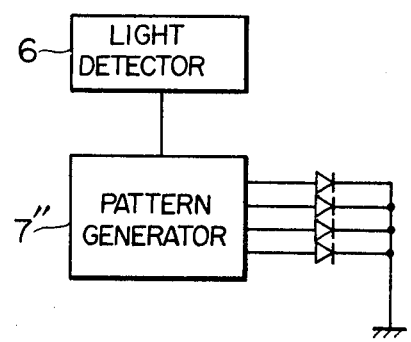
FIG. 10 shows schematically an arrangement of another main part of the optical recording apparatus shown in FIG. 4.

According to another aspect of the invention, it is possible to use a circuit shown in FIG. 10 in place of the signal generating circuit shown in FIG. 7. In the case of the circuit arrangement shown in FIG. 7, no delay circuits are employed to eliminate the trouble involved in adjusting the different time delays in the individual signal lines. Description will be made by referring to the signal diagram shown in FIG. 8. When the light detector 6 shown in FIG. 4 has an effective light sensitive area of an appropriately large dimension, all of the plural laser beams scanning over the drum surface can be sensed by the detector 6 during the scanning cycle, whereby the scanning positions of the individual laser beams can be respectively identified. In this case, the signal waveform output from the detector 6 will be such as shown at (A) in FIG. 8, in which the detector output pulses a, b, c and d are produced in response to the laser beams emitted from the light emitting parts $a_o$, $b_o$, $c_o$ and $d_o$ of the semiconductor laser array, respectively, on the exemplary assumption that four laser beams are used for the recording. Signals shown at (B), (C), (D) and (E) in FIG. 8 are voltage signals applied to the light emitting parts $a_o$, $b_o$, $c_o$ and $d_o$ of the semiconductor laser array, respectively. The pulse a shown in (A) of FIG. 8 which is produced in response to the laser beam emitted from the light emitting part $a_o$ of the semiconductor laser array is utilized as the synchronizing signal for the light emitting part $a_o$. In dependence on the position or time point of this pulse a, a pattern generating signal is applied to the light emitting part $a_o$ of the semiconductor laser array with a predetermined time delay $t_c$ (see (B) of FIG. 8).

Figure 9:
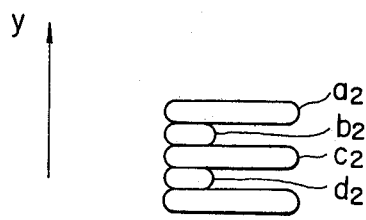
FIG. 9 illustrates an exemplary pattern produced and recorded according to the teaching of the invention.

The voltage signals shown in (C), (D) and (E) of FIG. 8 are applied to the light emitting parts $b_o$, $c_o$ and $d_o$ of the semiconductor laser array in response to the synchronizing pulses b, c and d shown in (A) of FIG. 8 with the predetermined time delay $t_c$, respectively. In FIG. 9, there is illustrated a pattern recorded in accordance with the pattern generating signals shown in FIG. 8. Referring to FIG. 9, pattern segments $a_2$, $b_2$, $c_2$ and $d_2$ are recorded by the laser beams produced by the light emitting parts $a_o$, $b_o$, $c_o$ and $d_o$ of the semiconductor laser array in response to the applications of the voltages $v_1$, $v_2$, $v_3$ and $v_4$ shown in FIG. 8 to the light emitting elements $a_o$, $b_o$, $c_o$ and $d_o$. The recorded pattern extends in parallel to the y-axis.

Signal waveforms $a_1$, $b_1$, $c_1$, and $d_1$ shown in FIG. 8 represent voltages applied to the light emitting parts $a_o$, $b_o$, $c_o$ and $d_o$ of the semiconductor laser array from the pattern generating circuit 7'' in order to cause the laser beams to be emitted from the above semiconductor lasers at the constant position of the light detector 6.

Although it has been assumed that the cylindrical lenses $L_3$ and $L_4$ are employed in the optical system shown in FIG. 4, the use of such cylindrical lenses is not always required. When no cylindrical lenses are used, the laser light spots concentrated onto the drum surface will take an elliptical form. In this case, the equation (4) applies also valid. However, the parameter $w_d$ is a dimension of the elliptical light spot in the y-direction.

Further, in the arrangement shown in FIG. 4, the optical scanning device is constituted by a polygonal mirror to be used in combination with a rotatable photosensitive drum. However, the rotatable polygonal mirror may be omitted if the recording medium is so displaced or moved that an equivalent scanning operation can be attained. Additionally, the recording medium can be replaced by a display screen which is capable of producing a visible image under illumination by laser light.

As will be appreciated from the foregoing description, the optical recording apparatus incorporating a semiconductor laser array according to the invention allows optical information recording to be carried out in a stable manner. Thus, the time taken for recording by each of the laser beams emitted by the plural light emitting parts of the semiconductor laser array may be relatively long without lowering the overall recording speed. Thus, the optical recording can be realized by using a semiconductor laser array having a relatively low output level.

We claim:

1. An optical recording apparatus comprising a semiconductor laser array having a plurality of light emitting parts arrayed in a row for emitting laser light beams intensity-modulated in accordance with predetermined information, recording means including a recording medium on which said modulated light beams are recorded, and optical means for conducting said modulated light beams from the arrayed light emitting parts to said recording medium to focus said light beams in row form on said recording medium and to scan said light beams in a predetermined direction on said recording medium, said arrayed light emitting parts being inclined so that, wherein said light beams are imaged on said recording medium in the row form in a direction slanted at a predetermined angle relative to the predetermined scanning direction.

2. An optical recording apparatus comprising a semiconductor laser array having a plurality of light emitting parts arrayed in a row, recording means having a recording surface of photo-sensitive material on which laser light beams emitted from the arrayed light emitting parts are recorded, optical means for conducting said light beams from said arrayed light emitting parts to said recording surface to focus said light beams in row form on said recording surface and to scan said light beams in a predetermined direction on said recording surface, said arrayed light emitting parts being inclined so that said light beams are focused in row form on the recording surface in a direction slanted at a predetermined angle relative to said predetermined scanning direction, signal generating means for generating electrical signals for allowing a given information pattern to be recorded on said recording surface, and control circuit means for applying said electrical signals from said signal generating means to said light emitting parts of said semiconductor laser array independently from one another thereby to individually modulate the intensities of said light beams from said light emitting parts.

3. An optical recording apparatus according to claim 2 wherein said optical means includes a rotatable polygonal mirror, and said recording surface is provided with the shape of a drum.

4. An optical recording apparatus according to claim 2 further comprising light detecting means for detecting the positions of said plural light beams conducted to said recording surface to produce output signals in correspondence to said light beams respectively, said output signals from said light detecting means being utilized as synchronizing signals for said control circuit means.

5. An optical recording apparatus according to claim 2 wherein said control circuit means provides different time delays for said light emitting parts of said semiconductor laser array.

6. An optical recording apparatus according to claims 1 or 2, wherein the arrayed light emitting parts and the optical means are arranged for enabling the light beams to be imaged on said recording medium with a high recording density while permitting stable operation of the semiconductor laser array.

7. An optical recording apparatus according to claims 1 or 2, wherein the arrayed light emitting parts and the optical means are arranged for enabling the light beams to be imaged on said recording medium with a high recording density independently of the heat generated by the arrayed light emitting parts.

* * * * *